(12) United States Patent
Tsuboi et al.

(10) Patent No.: US 9,596,705 B2
(45) Date of Patent: Mar. 14, 2017

(54) WIRELESS COMMUNICATION SYSTEM, TERMINAL APPARATUS, BASE STATION APPARATUS, WIRELESS COMMUNICATION METHOD, AND INTEGRATED CIRCUIT

(71) Applicant: Sharp Kabushiki Kaisha, Osaka-shi, Osaka (JP)

(72) Inventors: Hidekazu Tsuboi, Osaka (JP); Katsunari Uemura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/910,128

(22) PCT Filed: Jul. 31, 2014

(86) PCT No.: PCT/JP2014/070181
§ 371 (c)(1),
(2) Date: Feb. 4, 2016

(87) PCT Pub. No.: WO2015/019930
PCT Pub. Date: Feb. 12, 2015

(65) Prior Publication Data
US 2016/0183314 A1    Jun. 23, 2016

(30) Foreign Application Priority Data
Aug. 5, 2013   (JP) .................................. 2013-162119

(51) Int. Cl.
*H04W 72/00* (2009.01)
*H04W 76/02* (2009.01)
(Continued)

(52) U.S. Cl.
CPC ........... *H04W 76/02* (2013.01); *H04W 24/10* (2013.01); *H04W 72/04* (2013.01)

(58) Field of Classification Search
CPC ..... H04W 24/10; H04W 72/04; H04W 76/04; H04W 64/00; H04W 76/02; H04W 36/32;
(Continued)

(56) References Cited

U.S. PATENT DOCUMENTS

| | | | | |
|---|---|---|---|---|
| 7,372,842 B2 * | 5/2008 | Kim | ...................... | H04L 1/1854 370/345 |
| 2010/0302946 A1 * | 12/2010 | Yang | ...................... | H04B 7/155 370/235 |

(Continued)

FOREIGN PATENT DOCUMENTS

SE    WO 2013022392 A1 *  2/2013  ............ H04W 76/02

OTHER PUBLICATIONS

"3rd Generation Partnership Project; Technical Specification Group Radio Access Network; Evolved Universal Terrestrial Radio Access (E-UTRA); Mobility enhancements in heterogeneous networks (Release 11)", 3GPP TR 36.839 V11.1.0, Dec. 2012, pp. 1-53.

(Continued)

*Primary Examiner* — Mahendra Patel
(74) *Attorney, Agent, or Firm* — Keating & Bennett, LLP (57) ABSTRACT

In a wireless communication system, a terminal apparatus is capable of reporting, to a base station apparatus, information indicating a mobility state of the terminal apparatus. In a case where the terminal apparatus reports information (history information) to the base station apparatus as mobility state indicating information, the terminal apparatus notifies the base station apparatus of a radio resource control connection setup complete message containing information indicating the presence of the history information that is notified as the mobility state indicating information. The history information contains an identifier of a cell that the terminal apparatus visited and the duration of stay in the cell. The base station apparatus notifies the terminal apparatus of (Continued)

information as to whether to report the mobility state indicating information. In a case where the terminal apparatus reports the mobility state indicating information on the basis of the information notified by the base station apparatus, the terminal apparatus reports the history information to the base station apparatus using a radio resource control message different from the radio resource control connection setup complete message.

6 Claims, 4 Drawing Sheets

(51) Int. Cl.
*H04W 24/10* (2009.01)
*H04W 72/04* (2009.01)

(58) Field of Classification Search
CPC ......... H04W 4/02; H04W 8/08; H04W 48/18; H04B 7/155; H04L 47/11; H04L 47/30; H04L 1/0026
USPC ........................................................ 455/450
See application file for complete search history.

(56) References Cited

U.S. PATENT DOCUMENTS

| | | | | |
|---|---|---|---|---|
| 2010/0323719 | A1* | 12/2010 | Jen | H04W 64/00 455/456.1 |
| 2011/0217993 | A1* | 9/2011 | Tsutsui | H04W 74/008 455/458 |
| 2012/0046066 | A1* | 2/2012 | Tamura | H04L 1/0029 455/525 |
| 2012/0281561 | A1* | 11/2012 | Shukla | H04W 76/068 370/252 |
| 2013/0084869 | A1* | 4/2013 | Johansson | H04W 76/04 455/436 |
| 2013/0143617 | A1* | 6/2013 | Cea | H04W 52/241 455/522 |

OTHER PUBLICATIONS

Official Communication issued in International Patent Application No. PCT/JP2014/070181, mailed on Oct. 28, 2014.
"3rd Generation Partnership Project; Technical Specification Group Radio Access Network; Evolved Universal Terrestrial Radio Access (E-UTRA); Mobility enhancements in heterogeneous networks (Release 11)", 3GPP TR 36.389 V11.1.0, Dec. 2012, pp. 1-53.
MediaTek Inc., "Avoiding Fast UEs in Small Cells" 3GPP TSG-RAN2 #82 Meeting, R2-131774, May 20-24, 2013, pp. 1-2.
Ericsson et al., "Mobility estimation mechanism in Heterogeneous Networks", 3GPP TSG-RAN WG2 #81bis, Tdoc R2-131337, Apr. 15-19, 2013, pp. 1-5.
Ericsson et al., "Mobility Information at RRC Connection Establishment", 3GPP TSG-RAN WG2 #83, Tdoc R2-132682, Aug. 19-23, 2013, 11 pages.
Nokia Corporation et al., "Granularity of mobility information", 3GPP TSG-RAN WG2 Meeting #83bis, R2-133384, Oct. 7-11, 2013, 3 pages.

* cited by examiner

WIRELESS COMMUNICATION SYSTEM, TERMINAL APPARATUS, BASE STATION APPARATUS, WIRELESS COMMUNICATION METHOD, AND INTEGRATED CIRCUIT

TECHNICAL FIELD

The present invention relates to a wireless communication system that efficiently notifies a base station apparatus of a mobility state of a terminal apparatus, a terminal apparatus in a wireless communication system, a base station apparatus, a wireless communication method, and an integrated circuit.

The present application claims priority to Japanese Patent Application No. 2013-162119 filed in the Japanese Patent Office on Aug. 5, 2013, the disclosure of which is herein incorporated by reference in its entirety.

BACKGROUND ART

The 3GPP (Third Generation Partnership Project), which is a standardization project, has standardized Evolved Universal Terrestrial Radio Access (hereinafter referred to as "E-UTRA"), which achieves high-speed communications, by the adoption of the OFDM (orthogonal frequency-division multiplexing) communication scheme and flexible scheduling in predetermined units of frequency and time called resource blocks.

Further, the 3GPP is also working on the standardization of an evolutionary extension of E-UTRA, i.e., Advanced E-UTRA. Advanced E-UTRA envisages using a band up to a maximum bandwidth of 100 MHz for the uplink and the downlink alike to perform communications at maximum transmission rates of 1 Gbps or higher in the downlink and 500 Mbps or higher in the uplink.

Advanced E-UTRA is discussing Heterogeneous Network (hereinafter referred to as "HetNet") for efficient processing of locally generated communication traffic. HetNet is, in addition to conventional micro cells, a layered network in which small cells such as picocells and femtocells are placed so that cell areas are overlapped with macrocells (in the same frequencies or different frequencies). HetNet makes it possible to distribute communication traffic by transferring communications between terminal apparatuses near a small cell serving in a macrocell into the small cell. Therefore, the 3GPP is discussing a mechanism in which a terminal apparatus serving in a macrocell can efficiently detect and camp a small cell (NPL 1).

In a HetNet environment, the use (connection) of a small cell by (to) a terminal apparatus moving at a high speed may cause frequent occurrence of handover and thus undesirably increase signaling overhead. In view of this problem, NPL 2 discloses that at the time of RRC connection, a terminal apparatus notifies a base station apparatus of information concerning a mobility state of the terminal apparatus, whereby mobility control can be performed so that the base station apparatus does not hand over a rapidly moving terminal apparatus to a small cell.

CITATION LIST

Non Patent Literature

NPL 1: 3GPP TR (Technical Report) 36.839, V11.1.0, Evolved Universal Terrestrial Radio Access (E-UTRA); Mobility enhancements in heterogeneous networks NPL 2: R2-131774, Media Tek Inc., "Avoiding Fast UEs in Small Cells", 3GPP TSG-RAN WG2#82, Japan, 20-24 May 2013

NPL 3: R2-131337, Ericsson, "Mobility estimation mechanism in Heterogeneous Networks", 3GPP TSG-RAN WG2#8 ibis, USA, 15-19 Apr. 2013

SUMMARY OF INVENTION

Technical Problem

Under present circumstances, E-UTRA and Advanced E-UTRA have a mechanism in which in an RRC_IDLE state, a terminal apparatus performs a mobility state estimation of the terminal apparatus on the basis of the number of cells reselected in a specified period of time. It is conceivable that at the time of RRC connection, the terminal apparatus may report a result of this mobility state estimation (MSE result) to the base station apparatus as information indicating a mobility state of the terminal apparatus. However, in such a situation, as data communication on the background by a smartphone or the like, where there is frequent switching between the RRC_IDLE state and an RRC_CONNECTED state, there is no sufficient time to count the number of cells reselected, making it conceivable that the MSE result may be inaccurate. Further, NPL 1 discloses that since the current MSE is a mechanism that gives consideration to an environment of micro cells only, there is deterioration in estimation accuracy in a HetNet environment. Use of such inaccurate information by the base station apparatus makes it impossible to perform efficient mobility control.

Further, NPL 3 discloses notifying, as information indicating a mobility state at the time of RRC connection, information (UE history information) such as cells reselected in the RRC_IDLE state and the duration of stay in those cells. However, for example, in a case where the RRC_IDLE state is long and many cells are reselected, there is an undesirable increase in signaling overhead at the time of RRC connection.

It is therefore an object of embodiments of the present invention to solve at least one of the aforementioned problems by providing a wireless communication system that efficiently notifies a base station apparatus of a mobility state of a terminal apparatus, a terminal apparatus, a base station apparatus, a wireless communication method, and an integrated circuit.

Solution to Problem (1) A first aspect of the present invention is directed to a wireless communication system in which a terminal apparatus is capable of reporting, to a base station apparatus, information indicating a mobility state of the terminal apparatus, wherein in a case where the terminal apparatus reports information (history information) to the base station apparatus as mobility state indicating information, the terminal apparatus notifies the base station apparatus of a radio resource control connection setup complete message containing information indicating the presence of the history information that is notified as the mobility state indicating information, the history information containing an identifier of a cell that the terminal apparatus visited and the duration of stay in the cell, the base station apparatus notifies the terminal apparatus of information as to whether to report the mobility state indicating information, and in a case where the terminal apparatus reports the mobility state indicating information on the basis of the information notified by the base station apparatus, the terminal apparatus reports the history information to the base station apparatus using a radio resource control message different from the radio resource control connection setup complete message.

(2) A second aspect of the present invention is directed to a terminal apparatus capable of reporting, to a base station apparatus, information indicating a mobility state of the terminal apparatus, wherein in a case where the terminal apparatus reports information (history information) to the base station apparatus as mobility state indicating information, the terminal apparatus notifies the base station apparatus of a radio resource control connection setup complete message containing information indicating the presence of the history information that is notified as the mobility state indicating information, the history information containing an identifier of a cell that the terminal apparatus visited and the duration of stay in the cell, and in a case where the terminal apparatus reports the mobility state indicating information on the basis of information notified by the base station apparatus information as to whether to report the mobility state indicating information, the terminal apparatus reports the history information to the base station apparatus using a radio resource control message different from the radio resource control connection setup complete message.

(3) A third aspect of the present invention is directed to a base station apparatus that performs communication with a terminal apparatus, wherein the base station apparatus determines whether a radio resource control connection setup complete message notified from the terminal apparatus contains information indicating that the terminal apparatus has, as mobility state indicating information, information (history information) containing an identifier of a cell that the terminal apparatus visited and the duration of stay in the cell.

(4) A fourth aspect of the present invention is directed to a wireless communication method that is applied to a terminal apparatus capable of reporting, to a base station apparatus, information indicating a mobility state of the terminal apparatus, the method including at least the steps of in a case of reporting information (history information) to the base station apparatus as mobility state indicating information, notifying the base station apparatus of a radio resource control connection setup complete message containing information indicating the presence of the history information that is notified as the mobility state indicating information, the history information containing an identifier of a cell that the terminal apparatus visited and the duration of stay in the cell; and in a case of reporting the mobility state indicating information on the basis of information notified by the base station apparatus information as to whether to report the mobility state indicating information, reporting the history information to the base station apparatus using a radio resource control message different from the radio resource control connection setup complete message.

(5) A fifth aspect of the present invention is directed to an integrated circuit that is mounted in a terminal apparatus capable of reporting, to a base station apparatus, information indicating a mobility state of the terminal apparatus, the integrated circuit causing the terminal apparatus to fulfill the functions of in a case of reporting information (history information) to the base station apparatus as mobility state indicating information, notifying the base station apparatus of a radio resource control connection setup complete message containing information indicating the presence of the history information that is notified as the mobility state indicating information, the history information containing an identifier of a cell that the terminal apparatus visited and the duration of stay in the cell; and in a case of reporting the mobility state indicating information on the basis of information notified by the base station apparatus information as to whether to report the mobility state indicating information, reporting the history information to the base station apparatus using a radio resource control message different from the radio resource control connection setup complete message.

The embodiments are disclosed herein in terms of a technology related to a wireless communication system that efficiently notifies a base station apparatus of a mobility state of a terminal apparatus, a terminal apparatus, a base station apparatus, a wireless communication method, and an integrated circuit. A communication scheme applicable to the embodiments is not limited solely to an E-UTRA compatible communication scheme such as E-UTRA or Advanced E-UTRA.

For example, the technology described herein can be used in various communication systems using code division multiple access (CDMA), time division multiple access (TDMA), frequency division multiple access (FDMA), orthogonal FDMA (OFDMA), single-carrier FDMA (SC-FDMA), and other access schemes. Further, the terms "system" and "network" as used herein are synonymous with each other.

Advantageous Effects of Invention

As described above, an embodiment of the present invention can provide a wireless communication system that efficiently notifies a base station apparatus of a mobility state of a terminal apparatus, a terminal apparatus, a base station apparatus, a wireless communication method, and an integrated circuit.

DESCRIPTION OF EMBODIMENTS

The following briefly describes technologies related to embodiments of the present invention.

[Physical Channels/Physical Signals]

Main physical channels and physical signals that are used in E-UTRA and Advanced E-UTRA are described. The term "channel" means a medium that is used in the transmission and reception of signals, and the term "physical channel" means a physical medium that is used in the transmission and reception of signals. The term "physical channel" as used herein is synonymous with the term "signal". E-UTRA and Advanced E-UTRA may have additional physical channels or changes or additions to the structures and formats of physical channels in future. However, such changes or additions, if any, do not affect the description of the embodiments of the present invention.

E-UTRA and Advanced E-UTRA use wireless frames to manage scheduling of physical channels or physical signals. The duration of one wireless frame is 10 ms, and one wireless frame is constituted by ten subframes. Furthermore, one subframe is constituted by two slots (that is, the duration of one subframe is 1 ms, and the duration of one slot is 0.5 ms). Further, the management is implemented by using resource blocks as minimum units of scheduling on which physical channels are allocated. The resource block is defined by a certain frequency domain whose frequency axis is constituted by a group of subcarriers (e.g., twelve subcarriers) and a domain constituted by a certain transmission time interval (one slot).

Synchronization signals are constituted by three types of primary synchronization signals and secondary synchronization signals constituted by 31 types of code that are interleaved in a frequency domain, and combinations of the primary synchronization signals and the secondary synchronization signals indicate 504 cell identifiers (physical cell IDs (PCI: physical cell identities) that identify a base station apparatus and frame timings for wireless synchronization. A terminal apparatus specifies the physical cell ID of a synchronization signal received by a cell search.

A physical broadcast channel (PBCH) is transmitted for the purpose of notifying (configuring) control parameters (broadcast information (system information (SI)) that are shared by terminal apparatuses within a cell. As for broadcast information that is not notified through the physical broadcast channel, the terminal apparatuses within the cell are notified of a radio resource to which the broadcast information is transmitted through a physical downlink control channel, and in the radio resource thus notified, a layer 3 message (system information) that notifies the broadcast information through a physical downlink shared channel is transmitted.

As broadcast information, a cell global identifier (CGI) that indicates an identifier of an individual cell, a tracking area identifier (TAI) that manages an idle area by paging, random access configuration information, transmission timing adjustment information, shared radio resource configuration information in the cell, neighboring cell information, uplink access restriction information, and the like are notified.

Downlink reference signals are classified into a plurality of types depending on their applications. For example, cell-specific RSs (CRSs: cell-specific reference signals) are pilot signals that are transmitted with predetermined power for each separate cell, and are downlink reference signals that are periodically repeated in a frequency domain and a time domain on the basis of a predetermined rule. The terminal apparatus measures the reception quality of each separate cell by receiving these cell-specific RSs. Further, the terminal apparatus also uses the downlink cell-specific RSs as referential signals for demodulation of physical downlink control channels or physical downlink shared channels that are transmitted simultaneously with the cell-specific RSs. Sequences that can be identified for each separate cell are used for the cell-specific RSs.

Further, downlink reference signals can also be used in the estimation of downlink channel fluctuation. Downlink reference signals that are used in the estimation of downlink channel fluctuation are referred to as "channel state information reference signals (CSI-RSs)". Further, downlink reference signals that are configured for each separate terminal apparatus are referred to as "UE specific reference signals (URSs)" or "dedicated RSs (DRSs)", and are referred to for a channel compensation process of a channel when a physical downlink control channel or a physical downlink shared channel is demodulated.

A physical downlink control channel (PDCCH) is transmitted using the first few OFDM symbols (e.g., one to four OFDM symbols) of each subframe. An enhanced physical downlink control channel (EPDCCH) is a physical downlink control channel that is allocated on an OFDM symbol on which a physical downlink shared channel PDSCH is allocated. The PDCCH or the EPDCCH is used for the purpose of notifying the terminal apparatus of radio resource allocation information according to scheduling of the base station apparatus or information indicating an amount of adjustment of an increase or decrease in transmit power. Unless otherwise noted, the term "physical downlink control channel (PDCCH)" as simply used hereinafter means both physical channels PDCCH and EPDCCH.

The terminal apparatus needs to monitor a physical downlink control channel addressed thereto before transmitting or receiving a layer 3 message (such as paging, a handover command), which is downlink data or downlink control data, receive the physical downlink control channel addressed thereto, and thereby acquire, from the physical downlink control channel, radio resource allocation information called an uplink grant at the time of transmission or a downlink grant (downlink assignment) at the time of reception. It should be noted that instead of being transmitted using the aforementioned OFDM symbols, the physical downlink control channel may be transmitted using a region of a resource block that is dedicatedly allocated from the base station apparatus to the terminal apparatus.

A physical uplink control channel (PUCCH) is used for making a reception acknowledgment response (ACK/NACK: acknowledgement/negative acknowledgement) to data transmitted through a physical downlink shared channel, downlink channel (channel state) information (CSI), or an uplink radio resource allocation request (radio resource request, scheduling request (SR)).

CSI contains a CQI (channel quality indicator), a PMI (precoding matrix indicator), a PTI (precoding type indicator), and a RI (rank indicator). Each of the indicators may be denoted as indication.

A physical downlink shared channel (PDSCH) is used for notifying the terminal apparatus of, as a layer 3 message, paging and broadcast information (system information) that is not notified through a physical broadcast channel, as well as downlink data. Radio resource allocation information on the physical downlink shared channel is indicated by a physical downlink control channel. The physical downlink shared channel is transmitted by being allocated on an OFDM symbol other than an OFDM symbol through which the physical downlink control channel is transmitted. That is, the physical downlink shared channel and the physical control channel are time-division multiplexed within one subframe.

A physical uplink shared channel (PUSCH) mainly transmits uplink data and uplink control data, and may contain control data such as downlink reception quality and ACK/NACK. Further, the physical uplink shared channel is also used for notifying uplink control information, as well as the uplink data, as a layer 3 message from the terminal apparatus to the base station apparatus. Further, as with the downlink, radio resource allocation information on the physical uplink shared channel is indicated by a physical downlink control channel.

An uplink reference signal (also referred to as "uplink pilot signal" or "uplink pilot channel") contains a demodulation reference signal (DMRS) that the base station apparatus uses to demodulate a physical uplink control channel PUCCH and/or a physical uplink shared channel PUSCH and a sounding reference signal (SRS) that the base station apparatus uses to estimate an uplink channel state. Further, the sounding reference signal is either a periodic sounding signal (periodic SRS) that is periodically transmitted or an aperiodic sounding signal (aperiodic SRS) that is transmitted when instructed by the base station apparatus.

A physical random access channel (PRACH) is a channel that is used for notifying (configuring) a preamble sequence, and has guard time. The preamble sequence is configured to notify the base station apparatus of information by a plurality of sequences. For example, in a case where 64 types of sequence are prepared, 6 bits of information can be presented to the base station apparatus. The physical random access channel is used as means of access by the terminal apparatus to the base station apparatus.

The terminal apparatus uses a physical random access channel to make an uplink radio resource request when a physical uplink control channel has not been configured yet or to request the base station apparatus for transmission timing adjustment information (also called timing advance (TA)) that is needed to synchronize an uplink transmission timing with a reception timing window of the base station apparatus. Further, the base station apparatus can also use a physical downlink control channel to request the terminal apparatus to start a random access procedure.

A layer 3 message is a message that is handled by a CP (Control-plane, C-Plane) protocol that is exchanged between the RRC (radio resource control) layers of the terminal apparatus and the base station apparatus, and may be used synonymously with RRC signaling or an RRC message. It should be noted that as compared with the CP, a protocol that handles user data is referred to as UP (User-plane, U-Plane).

A detailed description of other physical channels or physical signals is omitted, as they are not involved in the embodiments of the present invention. Examples of physical channels or physical signals whose description has been omitted include a physical control format indicator channel (PCFICH), a physical HARQ indicator channel (PHICH: physical hybrid ARQ indicator channel), a physical multicast channel (PMCH), and the like.

[Wireless Network]

Communicable ranges (communication areas) of frequencies that are controlled by a base station apparatus is regarded as a cell. The communication areas covered by the base station apparatus may vary in size and shape according to the frequencies. Further, the covered areas may vary from frequency to frequency. A wireless network in which cells differing in type of base station apparatus and cell radius are mixed in areas of the same frequencies or different frequencies to form one communication system is referred to as "heterogeneous network".

A terminal apparatus operates with the inside of a cell regarded as a communication area. In moving out of a cell into another, the terminal apparatus moves into another appropriate cell through a cell reselection procedure in an RRC_IDLE state or through a handover procedure in an RRC_CONNECTED state. The term "appropriate cell" refers to a cell which terminal apparatuses in general are not prohibited from accessing on the basis of information designated by the base station apparatus and whose downlink reception quality satisfies a predetermined condition.

A base station apparatus may manage cells for each separate frequency. Cells are areas in which a terminal apparatus can communicate with the base station apparatus. Cells are categorized into a plurality of types according to the size (cell size) of an area in which the base station apparatus can communicate with a terminal apparatus. For example, cells are categorized into macrocells and small cells. A small cell is a cell that generally covers a range of radii from several meters to several tens of meters. Further, small cells may be categorized into femtocells, picocells, nanocells according to the size of area.

When the terminal apparatus is communicable with a base station apparatus, that one of the cells of the base station apparatus which is configured to be used for communication with the terminal apparatus is referred to as "serving cell", and the other cells, which are not used for communication, are referred to as "neighboring cells".

[Mobility State Estimation]

In a case of having been notified of mobility state parameters from a base station apparatus, a terminal apparatus applies a normal-mobility state, a high-mobility state, or a medium-mobility state as a mobility state of the terminal apparatus. The mobility state parameters notified from the base station apparatus include evaluation time (t-Evaluation), two thresholds (n-CellChangeHigh and n-CellChangeMedium) to be compared with the number of cell changes made during the evaluation time, and the after-mentioned t-HystNormal.

In the RRC_IDLE state, the terminal apparatus performs state detection. Specifically, the terminal apparatus detects the medium-mobility state in a case where the number of cell changes made during the evaluation time (t-Evaluation) exceeds n-CellChangeMedium and does not exceed n-CellChangeHigh. Further, the terminal apparatus detects the high-mobility state in a case where the number of cell changes made during the evaluation time (t-Evaluation) exceeds n-CellChangeHigh. If the same two cells are alternately reselected, the number is not included in the number of cell changes.

The terminal apparatus performs state transition on the basis of a result of state detection. Specifically, in a case where the high-mobility state has been detected, the terminal apparatus determines that it has entered the high-mobility state, and in a case where the medium-mobility state has been detected, the terminal apparatus determines that it has entered the medium-mobility state. Further, in a case where neither the high-mobility state nor the medium-mobility state has been detected in a certain period of time (t-HystNormal), the terminal apparatus determines that it has entered the normal-mobility state.

It should be noted that in a case where a new mobility state estimation method is introduced, mobility state parameters different from those named above may be notified. For example, identifier information and/or frequency information on cells to be counted may be notified.

In view of these circumstances, the following gives a detailed description of preferred embodiments of the present invention with reference to the accompanying drawings. It should be noted that in a case where a specific description of a publicly-known function or configuration associated with the embodiments of the present invention is judged to obscure the gist of the embodiments of the present invention, the description of the embodiments of the present invention omits such a detailed description.

[First Embodiment]

The following describes a first embodiment of the present invention.

Figure 1:
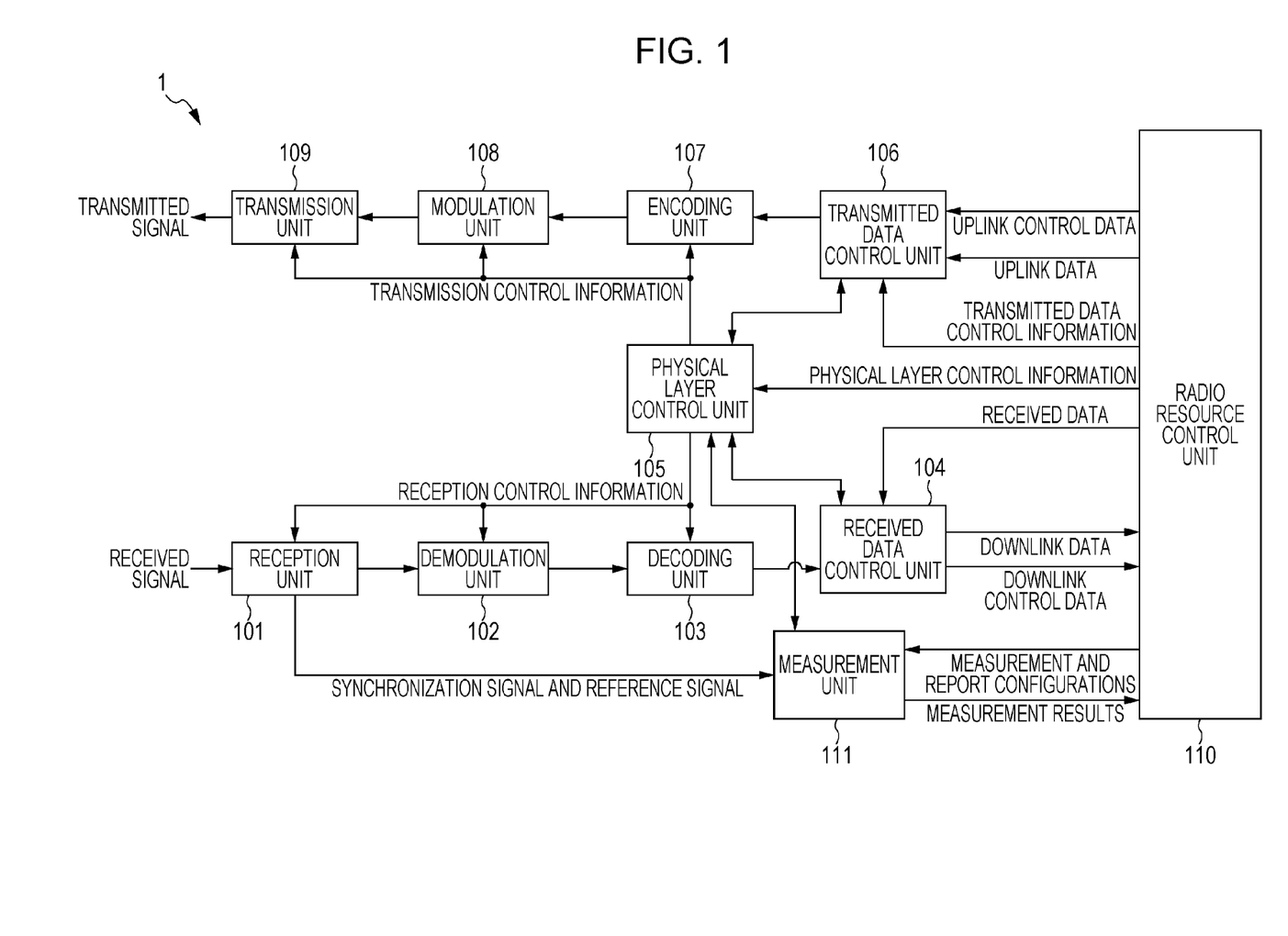
FIG. 1 is a block diagram schematically showing an example of a configuration of a terminal apparatus according to an embodiment of the present invention.

FIG. 1 is a block diagram schematically showing an example of a configuration of a terminal apparatus 1 according to a first embodiment of the present invention. The terminal apparatus 1 includes at least a reception unit 101, a demodulation unit 102, a decoding unit 103, a received data control unit 104, a physical layer control unit 105, a transmitted data control unit 106, an encoding unit 107, a modulation unit 108, a transmission unit 109, a radio resource control unit 110, and a measurement unit 111. The "units" in FIG. 1 are elements that achieve the functions and each procedure of the terminal apparatus 1, and may also be expressed by terms such as "sections", "circuits", "constituent devices", "devices", and "units".

The radio resource control unit 110 is a block that performs each function of an RRC (radio resource control) layer that performs radio resource control of the terminal apparatus 1. Further, the received data control unit 104 and the transmitted data control unit 106 are blocks that execute each function in an MAC (medium access control) layer, an RLC (radio link control) layer, and a PDCP (packet data convergence protocol) layer that manages the data link layer.

In a reception process of the terminal apparatus 1, received data control information is inputted from the radio resource control unit 110 to the received data control unit 104, and physical layer control information that is control parameters for controlling each block is inputted to the physical layer control unit 105. The physical layer control information is information, constituted by reception control information and transmission control information, which contains parameter configurations needed for the wireless communication control of the terminal apparatus 1.

The physical layer control information is configured by wireless connection resource configurations, cell-specific broadcast information, system parameters, or the like that are dedicatedly transmitted from a base station apparatus 2 to the terminal apparatus 1, and is inputted to the physical layer control unit 105 by the radio resource control unit 10 as needed. The physical layer control unit 105 appropriately inputs the reception control information, which is control information concerning reception, to the reception unit 101, the demodulation unit 102, and the decoding unit 103.

The reception control information contains, as downlink scheduling information, information such as information on a reception frequency band, reception timings regarding the physical channels and the physical signals, a multiplexing method, and radio resource allocation information. Further, the received data control information is downlink control information that contains DRX control information, multicast data reception information, downlink retransmission control information, and the like, and contains control information concerning the downlink in each of the MAC, RLC, and PDCP layers.

A received signal is received by the reception unit 101. The reception unit 101 receives a signal from the base station apparatus 2 in accordance with the frequencies and the frequency band designated by the reception control information. The signal thus received is inputted to the demodulation unit 102. The demodulation unit 102 demodulates the signal. The demodulation unit 102 inputs the signal thus demodulated to the decoding unit 103. The decoding unit 103 decodes the signal inputted thereto, and inputs each piece of decoded data (downlink data and downlink control data) to the received data control unit 104. Further, an MAC control element transmitted from the base station apparatus 2 together with each piece of data is also decoded by the decoding unit 103, and is inputted to the received data control unit 104.

The received data control unit 104 controls the physical layer control unit 105 on the basis of the received MAC control element, buffers each piece of decoded data, and performs error correction control (HARM) on retransmitted data. Each piece of data inputted to the received data control unit 104 is inputted (transferred) to the radio resource control unit 110.

Further, in a transmission process of the terminal apparatus 1, transmitted data control information is inputted from the radio resource control unit 110 to the transmitted data control unit 106, and physical layer control information that is control parameters for controlling each block is inputted to the physical layer control unit 105. The physical layer control unit 105 appropriately inputs transmission control information, which is control information concerning transmission, to the encoding unit 107, the modulation unit 108, and the transmission unit 109. The transmission control information contains, as uplink scheduling information, information such as encoding information, modulation information, information on a transmission frequency band, transmission timings regarding the physical channels and the physical signals, a multiplexing method, and radio resource allocation information.

Further, the transmitted data control information is uplink control information that contains DTX control information, random access configuration information, uplink shared channel information, logical channel priority information, resource request configuration information, uplink retransmission control information, and the like. The radio resource control unit 110 may configure, in the transmitted data control unit 106, plural pieces of random access configuration information respectively corresponding to a plurality of cells. Further, the radio resource control unit 110 manages transmission timing adjustment information and a transmission timing timer for use in adjustment of uplink transmission timing, and manages a state (transmission timing adjusted state or transmission timing non-adjusted state) of uplink transmission timing. The transmission timing adjustment information and the transmission timing timer are contained in the transmitted data control information.

The transmitted data (uplink data and uplink control data) generated by the terminal apparatus 1 is inputted from the radio resource control unit 110 to the transmitted data control unit 106 at a given timing.

The transmitted data control unit 106 stores the transmitted data in an uplink buffer in the transmitted data control unit 106 (not illustrated) when the transmitted data has been inputted to the transmitted data control unit 106. Then, the transmitted data control unit 106 determines whether a radio resource needed for the transmission of the transmitted data thus inputted has been allocated to the terminal apparatus 1. The transmitted data control unit 106 selects, on the basis of radio resource allocation, any one of a physical uplink shared channel PUSCH, a radio resource request using a physical uplink control channel (SR-PUCCH), and a radio resource request using a physical random access channel, and requests the physical layer control unit 105 for a control process for transmitting the selected channel.

That is, when a radio resource has been already allocated and the transmitted data is in a state where it can be transmitted through the physical uplink shared channel PUSCH, the encoding unit 107 acquires, from the uplink buffer, transmitted data corresponding to the radio resource allocated in accordance with an instruction from the radio resource control unit 110, encodes the transmitted data, and inputs the transmitted data to the modulation unit 108. Alternatively, when no radio resource has been allocated and a radio resource request (SR-PUCCH) is possible through the physical uplink control channel, the encoding unit 107 encodes control data needed for the transmission of SR-PUCCH in accordance with an instruction from the radio resource control unit 110, and inputs the control data to the modulation unit 108.

Alternatively, when no radio resource has been allocated and a radio resource request (SR-PUCCH) is impossible through the physical uplink control channel, the encoding unit 107 instructs the transmitted data control unit 106 to start a random access procedure. At this point in time, the encoding unit 107 generates a preamble sequence that is transmitted through the physical random access channel on the basis of the random access configuration information that is inputted from the transmitted data control unit 106. Further, the encoding unit 107 appropriately encodes each piece of data in accordance with the transmission control information and inputs the data to the modulation unit 108.

The demodulation unit 108 performs an appropriate modulation process on the basis of a channel structure in which each piece of encoded data is transmitted. The transmission unit 109 maps each piece of modulated data in a frequency domain, converts a signal of the frequency domain into a signal of a time domain, superposes the signal onto a predetermined carrier wave, and performs power amplification. Further, the transmission unit 109 adjusts the uplink transmission timing in accordance with the transmission timing adjustment information inputted from the radio resource control unit 110. The physical uplink shared channel on which the uplink control data is mapped can for example contain a layer 3 message (radio resource control message; RRC message) as well as user data.

Further, in order to perform measurements of a serving cell or a neighboring cell, the radio resource control unit 110 inputs physical layer control information for measurements to the physical layer control unit 105 and inputs measurement and report information to the measurement unit 111. The measurement unit 111 measures the received power (RSRP) and reception quality (RSRQ) of reference signals (predetermined signals such as CRS and CSI-RS) of the serving cell and/or the neighboring cell on the basis of the measurement and report information inputted from the radio resource control unit 110, and inputs measurement results to the radio resource control unit 110. For example, in the RRC_IDLE state, the measurement unit 111 performs measurements on the basis of information for cell reselection contained in system information contained in the broadcast information of the serving cell, and the radio resource control unit 110 performs reselection on the basis of the measurement results. Further, in the RRC_CONNECTED state, the measurement unit 111 performs measurements on the basis of the measurement and report information configured from the base station apparatus 2, and in a case where the measurement results satisfy report conditions, the radio resource control unit 110 reports the measurement results to the base station apparatus 2.

FIG. 1 omits to illustrate other constituent elements of the terminal apparatus 1 and paths of transmission of data (control information) among the constituent elements. However, it is obvious that the terminal apparatus 1 includes, as constituent elements, a plurality of blocks having other functions needed for the terminal apparatus 1 to operate as such. For example, an NAS layer unit that performs control with a core network and an application layer unit exit above the radio resource control unit 110.

Figure 2:
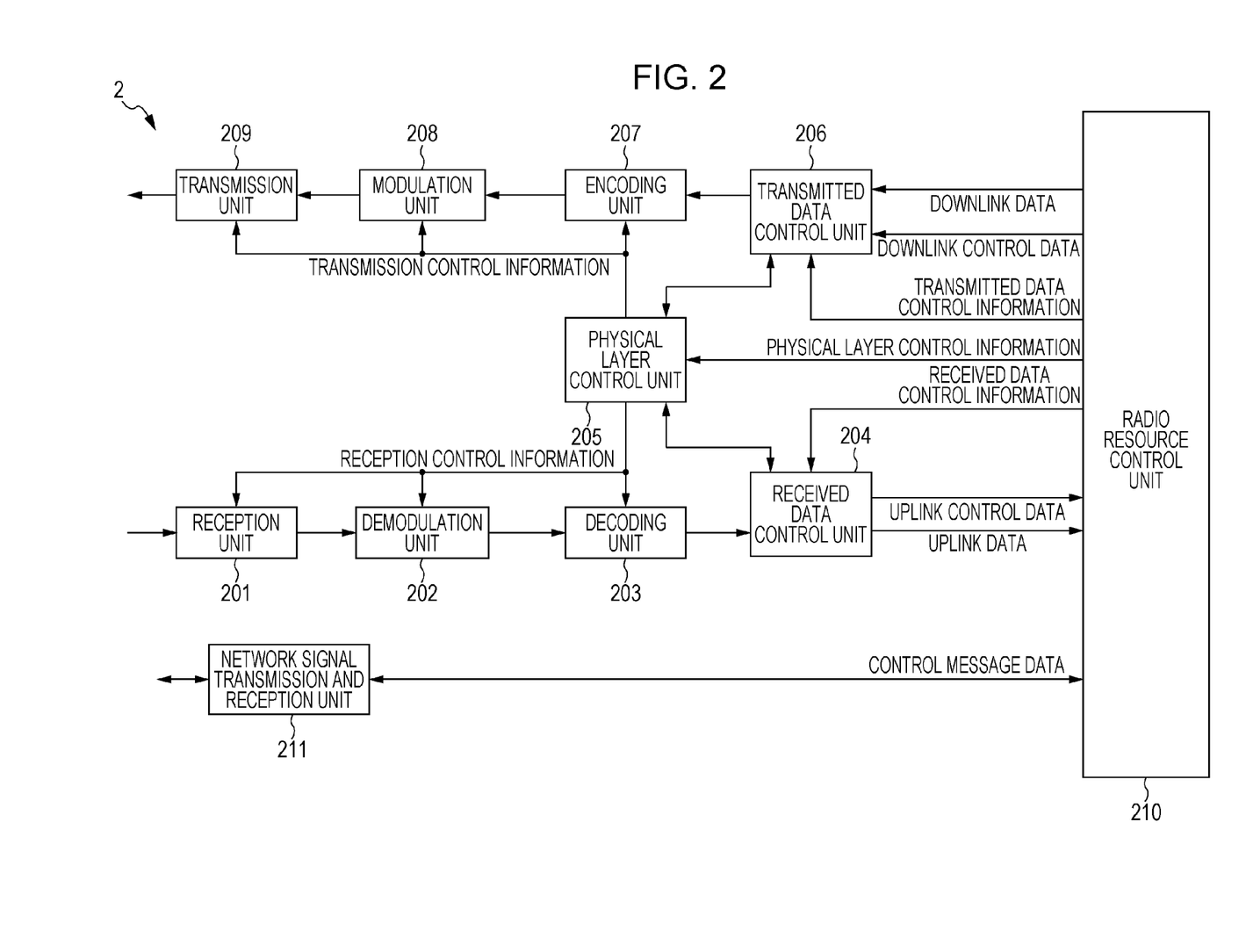
FIG. 2 is a block diagram schematically showing an example of a configuration of a base station apparatus according to an embodiment of the present invention.

FIG. 2 is a block diagram schematically showing an example of a configuration of a base station apparatus 2 according to the first embodiment of the present invention. The base station apparatus 2 includes at least a reception unit 201, a demodulation unit 202, a decoding unit 203, a received data control unit 204, a physical layer control unit 205, a transmitted data control unit 206, an encoding unit 207, a modulation unit 205, a transmission unit 209, a radio resource control unit 210, and a network signal transmission and reception unit 211. The "units" in FIG. 2 are elements that achieve the functions and each procedure of the base station apparatus 2, and may also be expressed by terms such as "sections", "circuits", "constituent devices", "devices", and "units".

The radio resource control unit 210 is a block that performs each function of an RRC (radio resource control) layer that performs radio resource control of the base station apparatus 2. Further, the received data control unit 204 and the transmitted data control unit 206 are blocks that execute each function in an MAC (medium access control) layer, an RLC (radio link control) layer, and a PDCP (packet data convergence protocol) layer that manage the data link layer.

The radio resource control unit 210 inputs downlink data and downlink control data to the transmitted data control unit 206. In the presence of an MAC control element to be transmitted to a terminal apparatus 1, the transmitted data control unit 206 inputs the MAC control element and each piece of data (downlink data or downlink control data) to the encoding unit 207. The encoding unit 207 encodes the MAC control element and each piece of data thus inputted, and inputs them to the modulation unit 208. The modulation unit 208 modulates the encoded signal.

Further, the signal modulated by the modulation unit 208 is inputted to the transmission unit 209. The transmission unit 209 maps the input signal in a frequency domain, converts the signal of the frequency domain into a signal of a time domain, superposes the signal onto a predetermined carrier wave, performs power amplification, and transmits the signal. The physical uplink shared channel on which the uplink control data is mapped typically constitutes a layer 3 message (RRC message).

Further, the reception unit 201 a signal received from the terminal apparatus 1 into a baseband digital signal. The digital signal converted by the reception unit 201 is inputted to and demodulated by the demodulation unit 202. The signal demodulated by the demodulation unit 202 is then inputted to the decoding unit 203. The decoding unit 203 decodes the input signal, and inputs each piece of decoded data (uplink data and uplink control data) to the received data control unit 204. Further, the MAC control element transmitted from the terminal apparatus 1 together with each piece of data is also decoded by the demodulation unit 203, and is inputted to the received data control unit 204.

The received data control unit 204 controls the physical layer control unit 205 on the basis of the received MAC control element, buffers each piece of decoded data, and performs error correction control (HARQ) on retransmitted data. Each piece of data inputted to the received data control unit 204 is inputted (transferred) to the radio resource control unit 210.

Physical layer control information needed for the control of each of these blocks is information, constituted by reception control information and transmission control information, which contains parameter configurations needed for the wireless communication control of the base station apparatus 2. The physical layer control information is configured by a higher-layer network apparatus (such as MME, a gateway apparatus, or OAM) and system parameters, and is inputted to the physical layer control unit 205 by the radio resource control unit 210 as needed.

The physical layer control unit 205 inputs transmission-associated physical layer control information as transmission control information to each of the blocks, namely the encoding unit 207, the modulation unit 208, and the transmission unit 209, and appropriately inputs reception-associated physical layer control information as reception control information to each of the blocks, namely the reception unit 201, the demodulation unit 202, and the decoding unit 203.

Received data control information contains control information concerning the uplink of a terminal apparatus 1 to each of the MAC, RLC, PDCP layers of the base station apparatus 2. Further, transmitted data control information contains control information concerning the downlink of a terminal apparatus 1 to each of the MAC, RLC, PDCP layers of the base station apparatus 2. That is, received data control information and transmitted data control information are configured for each separate terminal apparatus 1.

The network signal transmission and reception unit 211 performs transmission (transfer) or reception of a control message or user data between the base station apparatus 2 and another base station apparatus 2 or between a higher-layer network apparatus (MME or a gateway apparatus) and the base station apparatus 2. FIG. 2 omits to illustrate other constituent elements of the base station apparatus 2 and paths of transmission of data (control information) among the constituent elements. However, it is obvious that the base station apparatus 2 includes, as constituent elements, a plurality of blocks having other functions needed for the base station apparatus 2 to operate as such. For example, a radio resource management unit and an application layer unit exit above the radio resource control unit 210.

Figure 3:
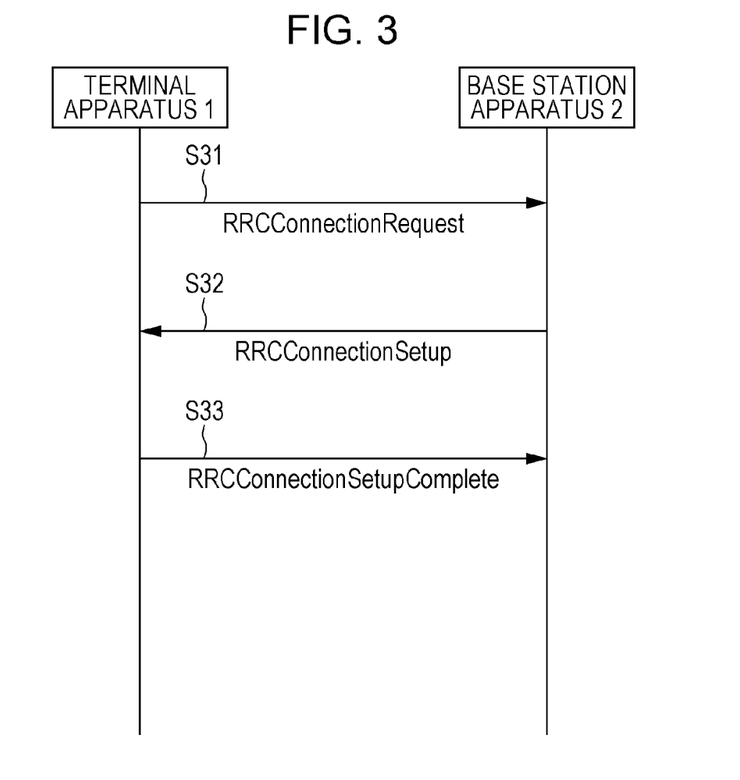
FIG. 3 is an example of a sequence chart showing an RRC connection procedure according to an embodiment of the present invention.

FIG. 3 shows an example of a sequence chart of an RRC connection procedure that a terminal apparatus 1 performs with respect to a base station apparatus 2 according to the first embodiment of the present invention.

In FIG. 3, the terminal apparatus 1 transmits, to the base station apparatus 2, an RRC connection request message (RRCConnectionRequest message) containing an identifier of the terminal apparatus 1 and a cause of connection (step S31).

Upon receiving the RRC connection request message, the base station apparatus 2 transmits an RRC connection setup message (RRCConnectionSetup message) to the terminal apparatus 1 in a case where the base station apparatus 2 permits connection from the terminal apparatus 1 (step S32). The RRC connection setup message contains the configurations of radio bearers for transmitting and receiving control signals and user data, the parameter configurations of the MAC layer, and the like.

Upon receiving the RRC connection setup message, the terminal apparatus 1 configures the configurations on the basis of the RRC connection setup message and, in a case where the configurations have been normally completed, transmits an RRC connection setup complete message (RRCConnectionSetupComplete message) to the base station apparatus 2 (step S33). In the present embodiment, the RRC connection setup complete message may contain information indicating a mobility state of the terminal apparatus 1. Such mobility state indicating information will be described later.

The above procedure allows the base station apparatus 2 to know the mobility state of the terminal apparatus 1 and utilize the mobility state for mobility control of the terminal apparatus 1 (such as determination of a target of measurement of the terminal apparatus 1 and determination of a handover destination cell).

Although the procedure of FIG. 3 shows an example in which mobility state indicating information is notified by an RRC connection setup complete message, this does not imply any limitation. Such information may be notified by another message containing the information, or may be notified using a new message. Alternatively, the RRC connection setup complete message may contain only information indicating the presence or absence of mobility state indicating information to be notified, and after that, the mobility state indicating information may be notified using another RRC message.

The following describes mobility state indicating information that is notified to the base station apparatus 2 according to the present embodiment.

Figure 4:
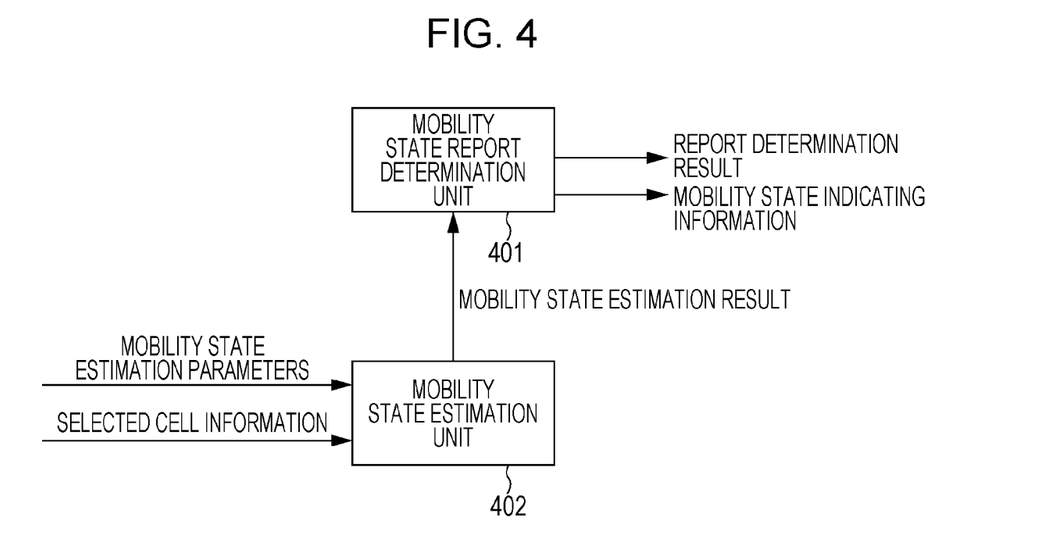
FIG. 4 is a block diagram showing examples of a mobility state report determination unit and a mobility state estimation unit of a radio resource control unit in a terminal apparatus according to a first embodiment of the present invention.

As shown in FIG. 4, the radio resource control unit 110 according to the present embodiment includes a mobility state report determination unit 401 and a mobility state estimation unit 402. The mobility state estimation unit 402 performs a mobility state estimation on the basis of mobility state estimation parameters contained in information broadcast from the base station apparatus 2 and information on cells selected by the terminal apparatus 1. A mobility state estimation result estimated by the mobility state estimation unit 402 is inputted to the mobility state report determination unit 401.

The mobility state report determination unit 401 determines, on the basis of a determination condition described later, whether to report, to the base station apparatus 2, the mobility state estimation result estimated by the mobility state estimation unit 402. The radio resource control unit 110 determines, on the basis of a report determination result determined by the mobility state report determination unit 401, whether the aforementioned RRC connection setup complete message to be transmitted contains the mobility state estimation result as mobility state indicating information. Note here that the mobility state estimation result is information that allows identification of a plurality of mobility states. The number of mobility states may be 3 as has conventionally been the case, namely the high-mobility state, the medium-mobility state, and the normal-mobility state, may be 2 based on new mobility state estimation parameters, namely a high-mobility state and a non-high-mobility state, or may exceed 3.

For example, the mobility state report determination unit 401 may determine to report in a case where the period of time during which the number of cells selected (including those reselected) in the RRC_IDLE state was actually counted satisfies the evaluation time (t-Evaluation). This makes it possible to prevent the terminal apparatus 1 from making an RRC connection in a state that does not satisfy the evaluation time and reporting that it has not entered the high-mobility state or the medium-mobility state, i.e., that it is in the normal-mobility state.

Alternatively, for example, the mobility state report determination unit 401 may clock a period of time elapsed since the transmission of the mobility state indicating information and determine to report in a case where the period of time elapsed satisfies (exceeds) a predetermined period of time. Alternatively, the mobility state report determination unit 401 may clock a period of time elapsed since the transition from the RRC_CONNECTED state to the RRC_IDLE state and determine to report in a case where the period of time elapsed satisfies a predetermined period of time. Further, even in a case where the period of time elapsed does not satisfy (exceed) the predetermined period of time, the mobility state report determination unit 401 may report in case of a change in mobility state. This allows a reduction in signaling overhead.

A timer is utilized to clock each of these periods of time. The terminal apparatus 1 starts (or restarts) the timer when it has shifted into the RRC_IDLE state or it has transmitted mobility state indicating information to the base station apparatus 2, and the timer expires in a case where the value of the timer has reached the evaluation time (t-Evaluation) or reached another predetermined value. The terminal apparatus 1 may report in a case where the timer has expired at the time of RRC connection.

Alternatively, for example, on the basis of report enabling or disabling information notified or reported from the base station apparatus 2, the mobility state report determination unit 401 may determine, for each separate cell, whether to report. This makes it possible to configure whether it is necessary to report on the basis of the load status of the network, the arrangement of cells (e.g., no small cell is around, and mobility state information is unnecessary), or the like, thus allowing a reduction in signaling overhead. Note here that the report enabling or disabling information may be broadcast by being contained in the system information, may be notified to the terminal apparatus 1 by the RRC connection setup message, or may be notified by another signal or message of the MAC layer, the RRC layer, or the NAS layer.

Alternatively, for example, in a case where the mobility state estimation unit 402 is capable of estimating a mobility state using other additional information (such as cell type or small cell frequency information) or measured value (such as RSRP, RSRQ, GPS, acceleration sensor, or Doppler frequency) instead of the conventional mobility state estimation, the mobility state report determination unit 401 may determine, on the basis of an estimation method of the mobility state estimation unit 402, whether to report. Furthermore, an estimation method may be designated which can be reported as the report enabling or disabling information that is notified or broadcast from the base station apparatus 2. This makes it possible, for example, to, without reporting an estimation result to which the conventional mobility state estimation has been applied, report only an estimation result requested by another mobility state estimation method, and the base station apparatus 2 can perform mobility control using an appropriate mobility state estimation result. Further, the prevention of an unnecessary report allows a reduction in signaling overhead.

Alternatively, for example, in a case where the mobility state estimation unit 402 is capable of estimating a mobility state with plural degrees of estimation accuracy according to the time or measured quantity for estimating the mobility state, estimation accuracy information may be reported in addition to a mobility estimation result. In this case, the mobility state report determination unit 401 may determine not to report in a case where none of the degrees of estimation accuracy has been satisfied. This allows the base station apparatus 2 to perform mobility control according to the accuracy of a mobility state estimation result.

Alternatively, in a case where a mobility state estimation result is reported by a determination unit and in a communication system in which a mobility state is selected from among two states (high-mobility state, non-high-mobility state), the mobility state estimation result may be reported only in a predetermined state (high-mobility state or non-high-mobility state). This makes it possible to reduce information that is notified.

Alternatively, the mobility state report determination unit 401 may make a determination with a combination of a plurality of these determination units.

By the terminal apparatus 1 thus determining, on the basis of the determination condition, whether to report its mobility state at the time of RRC connection, an unnecessary (inaccurate) report is prevented and signaling overhead is reduced. This enables the base station apparatus 2 to perform mobility control based on an appropriate report.

[Second Embodiment]

The following describes a second embodiment of the present invention. The first embodiment has shown an example of determining whether to notify a base station apparatus 2 of information indicating a mobility state of a terminal apparatus 1. The present embodiment shows an example in which in a case where a terminal apparatus 1 does not satisfy a determination condition, the terminal apparatus 1 notifies a base station apparatus 2 that the terminal apparatus 1 does not satisfy the determination condition.

A communication system (a terminal apparatus 1 and a base station apparatus 2) that is used in the description of the present embodiment is the same as that shown in FIGS. 1 and 2 according to the first embodiment, and as such, is not repeatedly described in detail. Further, mobility state indicating information according to the present embodiment, too, shows an example of being contained in the RRC connection setup complete message shown in FIG. 3 according to the first embodiment, and as such, is not repeatedly described in detail.

Figure 5:
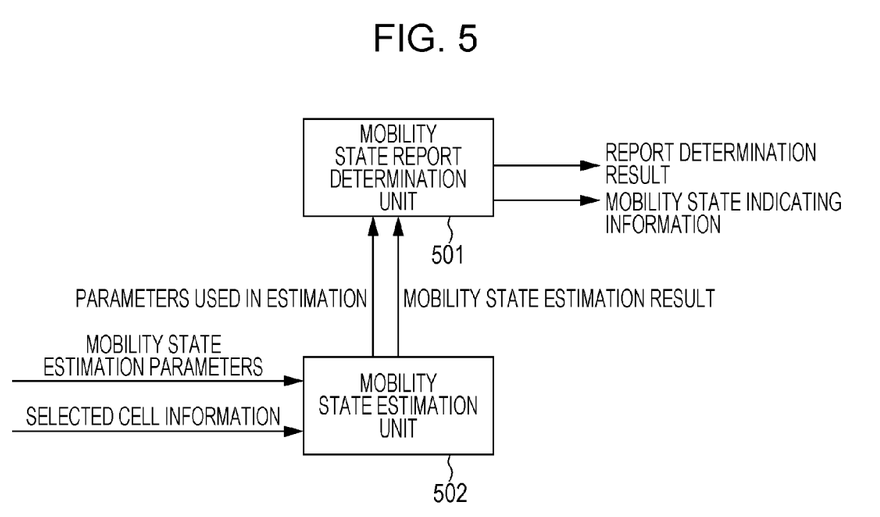
FIG. 5 is a block diagram showing examples of a mobility state report determination unit and a mobility state estimation unit of a radio resource control unit in a terminal apparatus according to a second embodiment of the present invention.

As shown in FIG. 5, the radio resource control unit 110 according to the present embodiment includes a mobility state report determination unit 501 and a mobility state estimation unit 502. The mobility state estimation unit 502 performs a mobility state estimation on the basis of mobility state estimation parameters contained in information broadcast from the base station apparatus 2 and information on cells selected by the terminal apparatus 1. Information such as a mobility state estimation result estimated by the mobility state estimation unit 502 and/or the parameters used in the estimation is inputted to the mobility state report determination unit 501.

The mobility state report determination unit 501 determines, on the basis of the after-mentioned determination condition, whether to report, to the base station apparatus 2, the mobility state estimation result estimated by the mobility state estimation unit 502 or report, to the base station apparatus 2, information indicating that the terminal apparatus 1 does not satisfy the determination condition (or a combination of the mobility state estimation result and the information indicating that the terminal apparatus 1 does not satisfy the determination condition). The radio resource control unit 110 determines, on the basis of a report determination result determined by the mobility state report determination unit 501, whether the aforementioned RRC connection setup complete message to be transmitted contains mobility state indicating information or the information indicating that the terminal apparatus 1 does not satisfy the determination condition.

For example, in a case where the period of time during which the number of cells selected (and reselected) in the RRC_IDLE state was actually counted satisfies (exceeds) the evaluation time (t-Evaluation (first evaluation time)), the mobility state report determination unit 501 may report a mobility state estimation result, and in a case where the period of time does not satisfy (does not exceed) the evaluation time, the mobility state report determination unit 501 may report, as the information indicating that the terminal apparatus 1 does not satisfy the determination condition, the period of time (t-Evaluation2 (second evaluation time) during which the number of cells selected (and reselected) in the RRC_IDLE state was actually counted. In a case where the evaluation time is not satisfied, a message containing t-Evaluation2 allows the base station apparatus 2 to recognize that the terminal apparatus 1 does not satisfy the determination condition. Alternatively, the difference between t-Evaluation and t-Evaluation2 may be reported instead of t-Evaluation 2. Furthermore, even in a case where the terminal apparatus 1 does not satisfy the determination condition, the message may contain mobility state indicating information in addition to the information indicating that the terminal apparatus 1 does not satisfy the determination condition.

Alternatively, for example, in a case where, in the RRC_IDLE state, an estimation result of the mobility state estimation unit 502 is a high-mobility state or a medium-mobility state and, furthermore, a state in which a high-mobility state or a medium-mobility state is not detected continues for a period of time (t-HystNormal2 (second measurement time) shorter than t-HystNormal (first measurement time), the mobility state report determination unit 501 may report t-HystNormal2 as the information indicating that the terminal apparatus 1 does not satisfy the determination condition. This enables the base station apparatus 2 to recognize whether the mobility state of the terminal apparatus 1 is close to a normal-mobility state, regardless of whether the mobility state of the terminal apparatus 1 is a high-mobility state or a medium-mobility state. Furthermore, in a case of performing a mobility state estimation of the terminal apparatus 1 based on the number of handovers, the use of t-HystNormal2 makes the base station apparatus 2 capable of a continued mobility state estimation. Alternatively, also in the case of mobility state transition between two states (a high-mobility state and a normal-mobility state), the mobility state report determination unit 501 may report t-HystNormal2 in a case where, in the RRC_IDLE state, an estimation result of the mobility state estimation unit 502 is a high-mobility state and, furthermore, a state in which a high-mobility state is not detected continues for a period of time shorter than t-HystNormal.

Alternatively, the mobility state report determination unit 501 may make a determination with a combination of a plurality of these determination units.

Alternatively, in a case where the terminal apparatus 1 does not satisfy the determination condition, the mobility state report determination unit 501 may notify at least one bit of information indicating that the terminal apparatus 1 does not satisfy the determination condition. This enables the base station apparatus 2 to recognize whether the terminal apparatus 1 is incapable of notifying mobility state indicating information or the terminal apparatus 1 is capable of notifying mobility state indicating information but did not satisfy the determination condition for reporting.

Alternatively, the first embodiment and the second embodiment may be combined. That is, for example, it may be that a mobility state estimation result is not reported in a case where the mobility state estimation method of the terminal apparatus 1 is a conventional estimation method, that a mobility state estimation result is reported in a case where a result estimated by an estimation method different from the conventional estimation method satisfies the determination condition, and that the information indicating that the determination condition is not satisfied may be reported in a case where the determination condition is not satisfied.

Thus, in a case where the terminal apparatus 1 does not satisfy the determination condition for reporting the mobility state of the terminal apparatus 1 at the time of RRC connection, the terminal apparatus 1 reports, to the base station apparatus 2, the information indicating that the terminal apparatus 1 does not satisfy the determination condition. This enables the base station apparatus 2 to perform mobility control based on an appropriate report.

[Third Embodimen]

The following describes a third embodiment of the present invention. The second embodiment has shown an example in which in a case where the mobility state report determination unit 501 does not satisfy the determination condition, the terminal apparatus 1 notifies the base station apparatus 1 that the terminal apparatus 1 does not satisfy the determination condition. The present embodiment shows an example in which in a case where a terminal apparatus 1 does not satisfy a determination condition, the terminal apparatus 1 notifies a base station apparatus 2 of another parameter (i.e., a useful parameter for the base station apparatus 2 to estimate a mobility state).

A communication system (a terminal apparatus 1 and a base station apparatus 2) that is used in the description of the present embodiment is the same as that shown in FIGS. 1 and 2 according to the first embodiment, and as such, is not repeatedly described in detail. Further, mobility state indicating information according to the present embodiment, too, shows an example of being contained in the RRC connection setup complete message shown in FIG. 3 according to the first embodiment, and as such, is not repeatedly described in detail.

Figure 6:
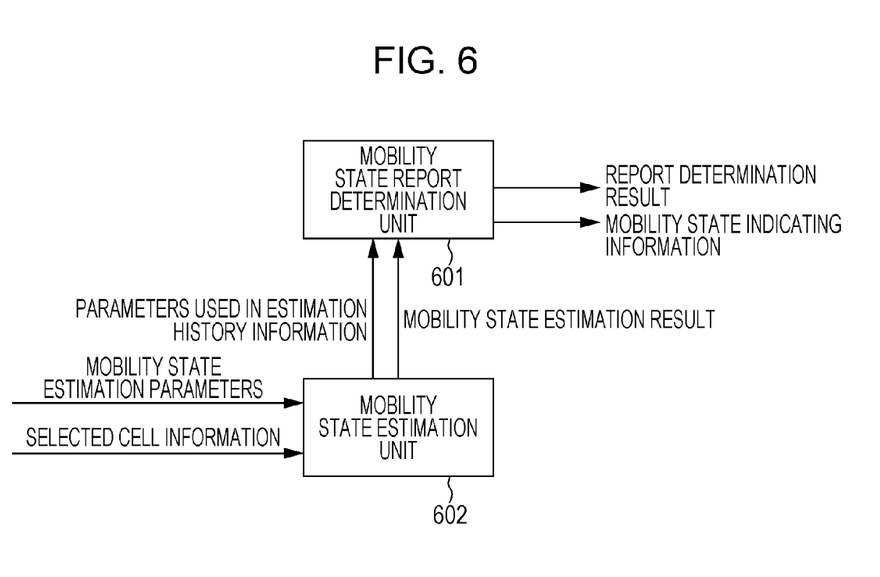
FIG. 6 is a block diagram showing examples of a mobility state report determination unit and a mobility state estimation unit of a radio resource control unit in a terminal apparatus according to a third embodiment of the present invention.

As shown in FIG. 6, the radio resource control unit 110 according to the present embodiment includes a mobility state report determination unit 601 and a mobility state estimation unit 602. The mobility state estimation unit 602 performs a mobility state estimation on the basis of mobility state estimation parameters contained in information broadcast from the base station apparatus 2 and information on cells selected by the terminal apparatus 1. Information such as a mobility state estimation result estimated by the mobility state estimation unit 602 and/or the parameters used in the estimation is inputted to the mobility state report determination unit 601. Further, history information such as the received power (RSRP) and reception power (RSRQ) of the serving cell and the duration of stay in the serving cell and the like may be inputted from the mobility state estimation unit 602 to the mobility state report determination unit 601.

In the present embodiment, the mobility state report determination unit 601 determines, on the basis of the determination condition described in the first and second embodiments, whether to report a mobility state estimation result estimated by the mobility state estimation unit 602 to the base station apparatus 2 or report other information to the base station apparatus 2.

For example, in a case where the period of time during which the number of cells selected (and reselected) in the RRC_IDLE state was actually counted satisfies the evaluation time (t-Evaluation), the mobility state report determination unit 601 may report the mobility state estimation result, and in a case where the period of time does not satisfy the evaluation time, the mobility state report determination unit 601 may report the history information as the other information. The history information is the number of identifiers or cells selected (and reselected) in the RRC_IDLE state, the identifiers of cells handed over in the RRC_CONNECTED state, the number of cells handed over, time information for each cell selected (and reselected) or for each cell handed over (i.e., time of entrance into a cell, time of exit from a cell, the duration of stay in the serving cell), or a combination of these. Thus, the terminal apparatus 1 notifies the base station apparatus 2 of detailed history information only in a case where the evaluation time is not satisfied. This enables a reduction in signaling overhead.

Alternatively, for example, in a case where the period of time during which the number of cells selected (and reselected) in the RRC_IDLE state was actually counted satisfies the evaluation time (t-Evaluation), the mobility state report determination unit 601 may report the mobility state estimation result, and in a case where the period of time does not satisfy the evaluation time, the mobility state report determination unit 601 may report, as the other information, a period of time (t-Evaluation2) during which the number of cells was actually counted and the number of cells counted during the period of time or identifier information of the cells counted. This makes the base station apparatus 2 capable of a mobility state estimation containing information on the RRC_CONNECTED state by using t-Evaluation2 and the number of cells or the identifiers of cells in a case of performing a mobility state estimation of the terminal apparatus 1 based on the number of handovers in the RRC_CONNECTED state.

Thus, in a case where the determination condition is satisfied, the mobility state estimation result is reported, and in a case where the determination condition is not satisfied, the other information (e.g., history information of selected cells) is reported. This causes the mobility state estimation result to be reported in a case where the RRC_IDLE state is long and the mobility state estimation result yielded by the terminal apparatus 1 is sufficiently useful or causes the other information (e.g., history information of selected cells) to be reported in a case where the RRC_IDLE state is short and the precision of the mobility state estimation result by the terminal apparatus 1 is poor. This allows the base station apparatus 2 to estimate the mobility state of the terminal apparatus 1, thus enabling the base station apparatus 2 to perform appropriately mobility control on the terminal apparatus 1.

Further, in each of the embodiments described above, in getting reconnected to the same cell as that to which the terminal apparatus 1 made the last RRC connection, the terminal apparatus 1 may report in a case where there is a change from the mobility state the terminal apparatus 1 reported last and not report in a case where there is no such change. Further, in a case of using a new mobility state estimation method, the terminal apparatus 1 may report information whether the mobility state estimation result was estimated by the conventional method or the new method. Further, even in a case of having satisfied the evaluation time, the terminal apparatus 1 may report the history information as the other information.

The names of the parameters described in the above embodiments of the present invention are used for convenience of explanation, and differences between the names of parameters that are actually applied and the names of the parameters according to the present invention, if any, do not affect the spirit of invention claimed by the present invention.

An embodiment of the present invention has been described in detail with reference to the drawings. However, a specific configuration is not limited to that described above, and design variations and the like can be made, provided such variations do not depart from the gist of the invention.

Further, a terminal apparatus 1 according to any of the embodiments described above can be applied to stationary or immovable electronic devices that are installed indoors or outdoors, as well as portable or movable mobile station apparatuses, such as audiovisual equipment, kitchen appliances, cleaning and washing machines, air-conditioning equipment, office devices, vending machines, domestic appliances, measuring instruments, and on-board units. A terminal apparatus 1 is also referred to as "user terminal", "mobile station apparatus", "communication terminal", "mobile machine", "terminal", "UE (user equipment)", and "MS (mobile station)". A base station apparatus 2 is also referred to as "wireless base station apparatus", "base station", "wireless base station", "fixed station", "NB (Node-B)", "eNB (evolved Node-B)", "BTS (base transceiver station)", and "BS (base station)".

For convenience of explanation, a base station apparatus 2 and a terminal apparatus 1 according any of the embodiments have been described with reference to functional block diagrams. However, the functions of the components of the base station apparatus 2 and the terminal apparatus 1 or the steps of a method or algorithm for achieving a part of these functions can be directly embodied by hardware, a software module that is executed by a processor, or a combination of these two. A function implemented by software can be held or communicated as one or more commands or codes on a computer-readable medium. The computer-readable storage medium encompasses both communication media including a medium that helps carry a computer program from one place to another and computer storage media.

Moreover, the base station apparatus 2 and the terminal apparatus 1 may be controlled by storing one or more commands or codes in a computer-readable storage medium, causing a computer system to read in the one or more commands or codes stored in the storage medium, and executing the one or more commands or codes. The term "computer system" as used herein encompasses hardware such as OSs and peripherals.

Operation described in any of the embodiments of the present invention may be achieved by a program. A program that runs on a base station apparatus 2 and a terminal apparatus 1 according to any of the embodiments of the present invention is a program that controls a CPU or the like (i.e., a program that causes a computer to function) so that the functions of the above-described embodiments of the present invention are achieved. Moreover, information that is handled by these devices is temporarily accumulated in RAM during processing thereof, stored in various types of ROM and/or HDD after that, and read out by the CPU as needed for modification and/or writing. Further, not only are the functions of the embodiments described above achieved by executing the program, but also the functions of the present invention may be achieved by executing processing in cooperation with an operating system or another application program on the basis of instructions from the program.

Further, the term "computer-readable storage medium" refers to storage devices such as portable media such as semiconductor media (such as RAM and nonvolatile memory cards), optical storage media (such as DVDs, MOs, CDs, and BDs), and magnetic storage media (such as magnetic tapes and flexible disks) and disk units built in computer systems. Furthermore, the term "computer-readable storage medium" also encompasses a medium in which the program is dynamically held for a short period of time, such as a communication wire in the case of transmission of the program via a network such as the Internet or a communication line such as a telephone line, and, in that case, a medium in which the program is held for a certain period of time, such as a volatile memory inside of a computer system serving as a server or a client.

Further, the program may be the one that serves to achieve a part of the functions described above. Furthermore, the program may be the one that can achieve the above-described functions in combination with a program already stored in a computer system.

The functional blocks or features of a base station apparatus 2 and a terminal apparatus 1 used in any of the above embodiments may be implemented or executed by a general-purpose processor designed to execute the functions described herein, a digital signal processor (DSP), an application-specific or general-use integrated circuit (ASIC), a field programmable gate array signal (FPGA), or other programmable logical devices, discrete gates, or transistor logic, discrete hardware components, or a combination of these. The general-purpose processor may be a microprocessor. Alternatively, the processor may be a conventional processor, controller, microcontroller, or state machine. The general-purpose processor or each of the circuits mentioned above may be constituted by a digital circuit or an analog circuit.

Alternatively, the processor may be implemented as a combination of computing devices. Examples include a combination of a DSP and a microprocessor, a plurality of microprocessors, one or more microprocessors connected to a DSP core, or a combination of such configurations. Further, in a case where a technology of integrated circuit construction alternative to LSI comes out due to the advancement of technology, it is possible to use integrated circuits based on such a technology.

The foregoing has described embodiments of the present invention with reference to particular specific examples. However, it is apparent that the spirit of the present invention and the scope of claims are not limited to these particular specific examples. That is, the description given herein is intended for illustrative purposes and does not impose any restrictions on the present invention.

INDUSTRIAL APPLICABILITY

An aspect of the present invention can be applied to a wireless communication system that efficiently notifies a base station apparatus of a mobility state of a terminal apparatus, a terminal apparatus, a base station apparatus, a wireless communication method, and an integrated circuit.

REFERENCE SIGNS LIST

1 Terminal apparatus
2 Base station apparatus
101, 102 Reception unit
102, 202 Demodulation unit
103, 203 Decoding unit
104, 204 Received data control unit
105, 205 Physical layer control unit
106, 206 Transmitted data control unit
107, 207 Encoding unit
108, 208 Modulation unit
109, 209 Transmission unit
110, 210 Radio resource control unit
111 Measurement unit
211 Network signal transmission and reception unit
401, 501, 601 Mobility state report determination unit
402, 502, 602 Mobility state estimation unit

The invention claimed is:

1. A terminal apparatus which communicates with a base station apparatus, the terminal apparatus comprising:
a storage that stores history information which contains first information which concerns a cell which the terminal apparatus visited; and
radio resource control circuitry that
includes second information in a radio resource control connection setup complete message, the second information indicating a presence of the history information, the radio resource control connection setup complete message not including the history information, the inclusion of the second information being performed in a case that the history information is present in the storage; wherein
the radio resource control circuitry notifies the base station apparatus of the radio resource control connection setup complete message; and
the history information contains:
an identifier of the cell which the terminal apparatus visited and
a duration of stay in the cell.

2. The terminal apparatus according to claim 1, wherein
in a case that third information is notified from the base station apparatus, the third information is to request the history information,
the terminal apparatus reports the history information to the base station apparatus, the report being performed by using a radio resource control message, the radio resource control message being different from the radio resource control connection setup complete message.

3. A base station apparatus which communicates with a terminal apparatus, the base station apparatus comprising:
radio resource control circuitry that receives, from the terminal apparatus, which includes a storage that stores history information which contains first information which concerns a cell which the terminal apparatus visited, a radio resource control connection setup complete message, the radio resource control connection setup complete message including second information, the second information indicating a presence of the history information, wherein
the radio resource control connection setup complete message does not include the history information,
the reception is performed in a case that the history information is present in the storage; and
the history information contains:
an identifier of the cell which the terminal apparatus visited and
a duration of stay in the cell.

4. The base station apparatus according to claim 3, wherein
the radio resource control circuitry receives the history information from the terminal apparatus, the history information being reported by using a radio resource control message, and the radio resource control message being different from the radio resource control connection setup complete message.

5. A wireless communication method performed by a terminal apparatus which communicates with a base station apparatus, the wireless communication method comprising:
including second information in a radio resource control connection setup complete message, the second information indicating a presence of history information which contains first information which concerns a cell which the terminal apparatus visited is present, the radio resource control connection setup complete message not including the history information, the including being performed in a case that the history information is present in a storage of the terminal apparatus, the storage storing the history information; and
notifying the base station apparatus of the radio resource control connection setup complete message; wherein
the history information contains:
an identifier of the cell which the terminal apparatus visited and
a duration of stay in the cell.

6. A wireless communication method performed by a base station apparatus which communicates with a terminal apparatus, the wireless communication method comprising:
receiving, from the terminal apparatus which includes a storage that stores history information which contains first information which concerns a cell which the terminal apparatus visited, a radio resource control connection setup complete message, the radio resource control connection setup complete message including second information, wherein
the second information indicates a presence of the history information, the radio resource control connection setup complete message not including the history information,
the receiving being performed in a case that the history information is present in the storage; and
the history information contains:
an identifier of the cell which the terminal apparatus visited and
a duration of stay in the cell.

* * * * *